Jan. 8, 1952 T. EVANGELISTA 2,581,474
SELF-CENTERING CHUCK
Filed Oct. 28, 1948 2 SHEETS—SHEET 1
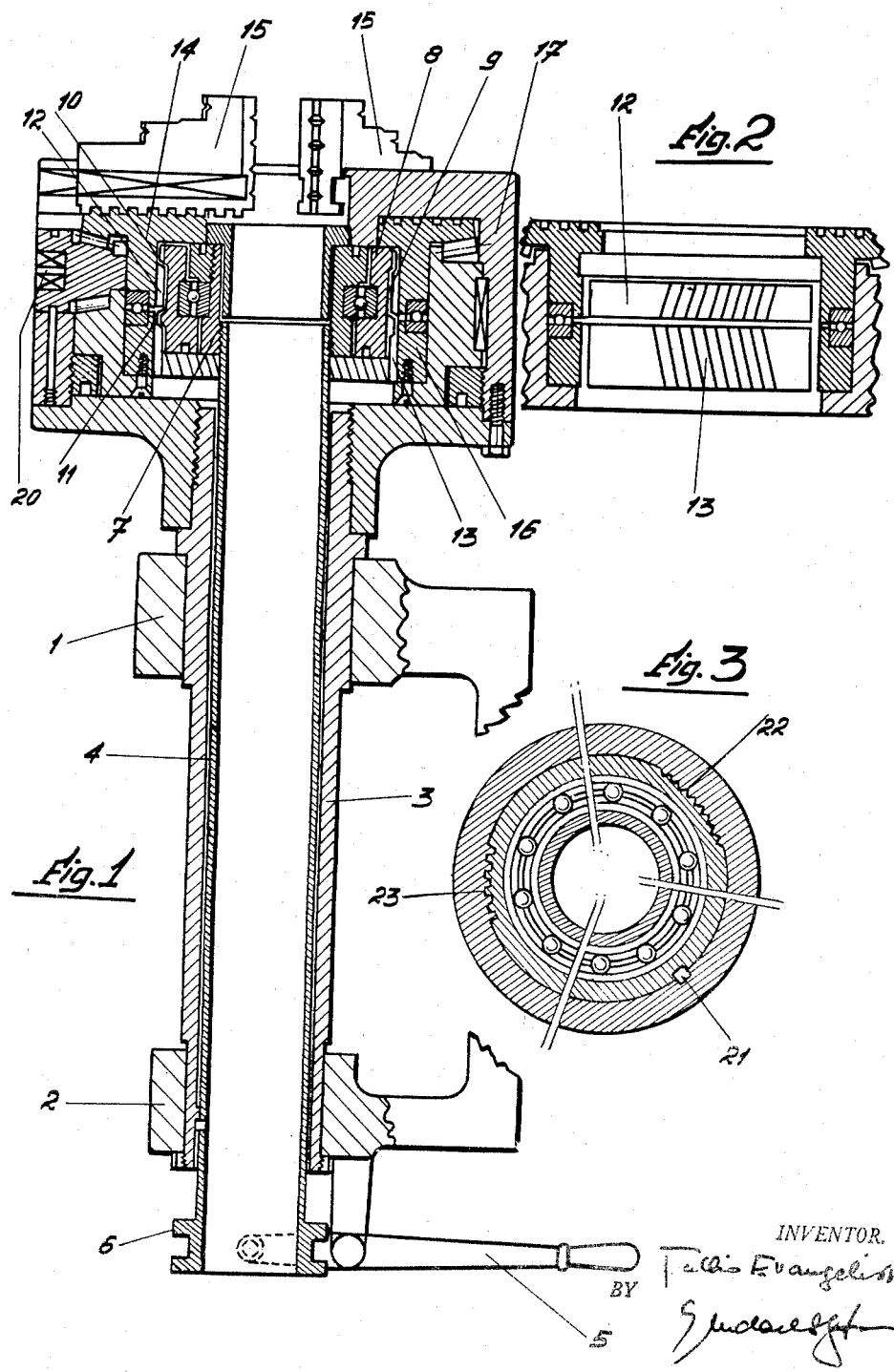

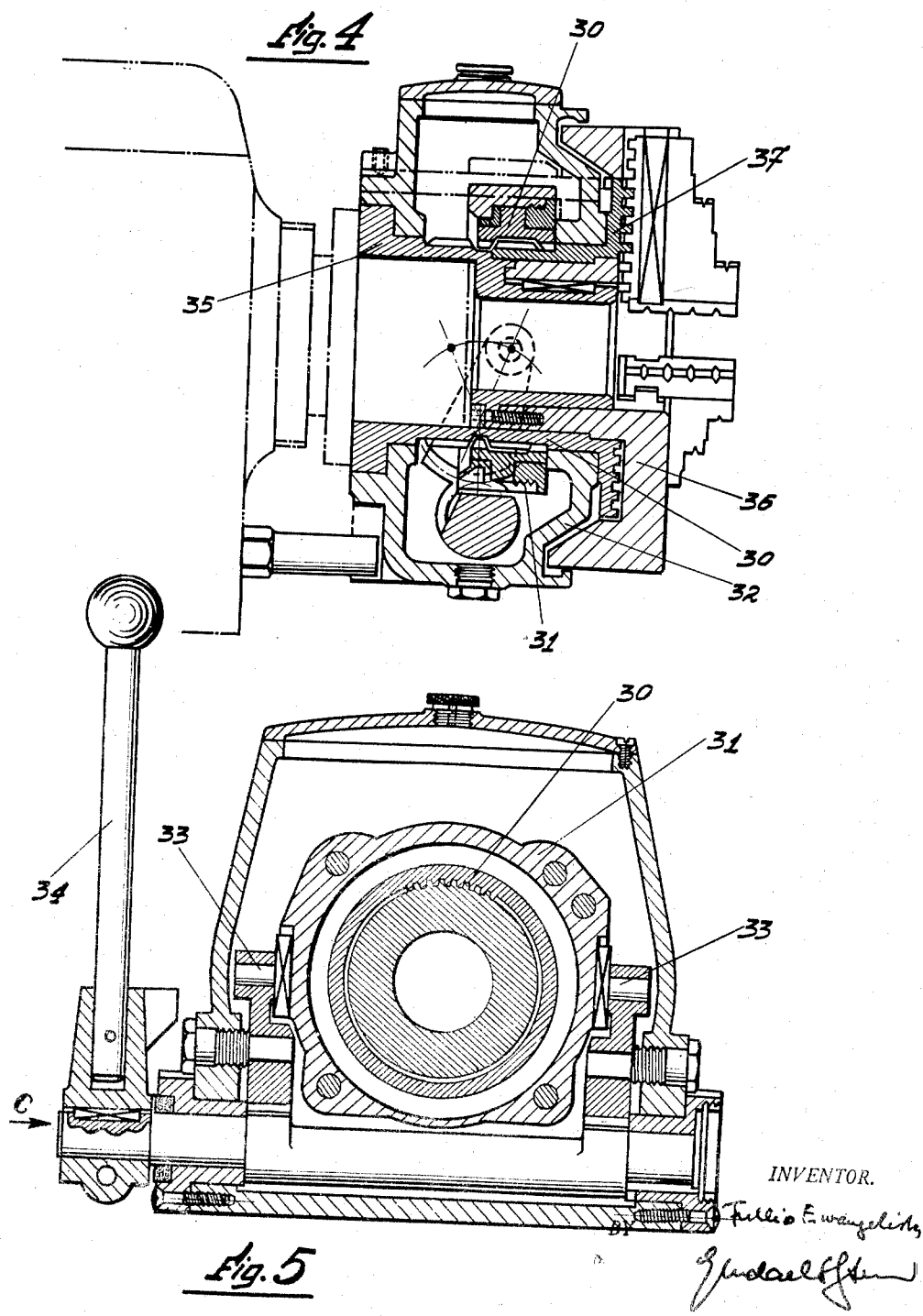

Patented Jan. 8, 1952

2,581,474

UNITED STATES PATENT OFFICE 2,581,474

SELF-CENTERING CHUCK

Tullio Evangelista, Milan-Bovisa, Italy

Application October 28, 1948, Serial No. 56,970
In Italy November 5, 1947

2 Claims. (Cl. 279—114)

My present invention relates to self-centering chucks.

One of the objects of my present invention is to provide a self-centering chuck in which the clamping members may be moved toward and away from each other while the chuck is rotating or when the chuck is stationary.

The chuck of my present invention may be used in conventional lathes, in turret lathes, automatic lathes, grinding machines of all types, or in machine tools where a quick replacement or shifting of the work is required or convenient while the machine tool is operating.

In conventional self-centering chucks where the work may be changed during the operation of the machine or when the machine is idle, the operating parts of the chuck are continually moving with respect to each other during the operation of the machine, although they may be idling. This continuous movement of the operating parts of conventional chucks results in wear of the parts and noisy operation.

Another object of my present invention is to provide a chuck which overcomes the above-mentioned undesirable characteristics by providing operating means for the chuck clamps which does not comprise parts which rotate and mesh with respect to each other during the operation of the machine, but instead rotate with the body of the chuck or remain stationary and have no parts moving relatively to the chuck during the operation of the machine.

A further object of my present invention is to provide a chuck which may be opened or closed by relatively short amounts during the operation thereof so as to permit the changing of the work piece while the machine is operating.

With the above objects in view, my present invention mainly consists of a chuck body having radially disposed guideways upon one side thereof; a rotatably adjustable scroll plate in the chuck body having a plurality of spiral grooves upon one side thereof; a plurality of radially movable jaws upon the chuck body slidably guided in the radial guideways thereon and having inward projections corresponding to and meshing with the spiral grooves in the scroll plate; an axially displaceable member having at least one portion thereof disposed in the chuck body; a collar fixed on the scroll plate with at least a first helicoidal member fixed upon the collar and inclined in one direction with respect to the central axis of the chuck; an annular member in the chuck body substantially aligned with the collar with at least one further helicoidal member fixed thereon and inclined in another direction with respect to said central axis of the chuck; means for axially shifting the axially displaceable member; and a further annular member carried on the latter displaceable member having integral means projecting thereon for simultaneously engaging with the first and further helicoidal members in axial direction of movement of said displaceable member to rotatably adjust said scroll plate and thereby correspondingly move said jaws in said radial guideways.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a longitudinal section through a self-centering chuck constructed in accordance with my present invention;

Fig. 2 is a cross sectional view of part of the structure shown in Fig. 1;

Fig. 3 is a sectional plan view of part of the structure shown in Figs. 1 and 2;

Fig. 4 is a sectional view through another embodiment of a self-centering chuck constructed in accordance with my present invention; and Fig. 5 is a transverse sectional view of the structure shown in Fig. 4.

Referring to the embodiment shown in Figs. 1-3 of the drawings, elements 1 and 2 are support members which rotatably support the elongated tubular member 3 which is threadedly connected at one end to the chuck body. Slidably supported within tubular member 3 is a tubular member 4 having the collar 6 located at one end thereof. The pivotally mounted lever 5 cooperates with a groove formed in the collar 6 so as to produce a longitudinal shifting of tubular member 4 within tubular member 3 upon oscillation of lever 5.

Threadedly connected to the other end of tubular member 4 is a coupling element 7 which supports the roller bearing 8. Mounted on the other side of roller bearing 8 from couping element 7 is an annular gear member 9 having mutually spaced helical gear teeth 10 and 11 formed on the outer surface thereof.

The chuck body 17 which is threadedly connected to tubular member 3 has three radial slots formed in the outer front face thereof and supports the three clamp members 15 in these slots. The lower sides of clamp members 15, as viewed in Fig. 1, have teeth formed therein which cooperate with the spiral groove formed in scroll plate member 14. Depending from member 14 is an annular gear member having internal helical teeth 12. Concentrically aligned with the above-mentioned annular gear member is another annular gear member 16 having internal helical teeth 13. The member 16 is fixedly mounted with respect to chuck body 17. Member 14 with its depending annular gear is rotatably mounted with respect to member 16 by means of a roller bearing interposed between these two members, as shown in Fig. 1. The helical teeth 12 and 13 are inclined in opposite direction with respect to the axis of tubular member 4, as is clearly shown in Fig. 2.

The cooperating tooth members of elements 9, 14 and 16 may take the form of pointed teeth 22 which are arranged close to each other, as shown in Fig. 3, spaced teeth 23, as shown in Fig. 3, or keys 21 cooperating with key ways as is also shown in Fig. 3.

With the position of the above-described mechanism as shown in Fig. 1, the teeth 10 and 11 are located out of mesh with the teeth 12 and 13 so that the mechanism is in idle position. When the machine is stationary, and the parts are in position shown in Fig. 1 the scroll plate 14 may be turned to any desired position so as to move clamp members 15 inwardly or outwardly by rotation of element 20 which is rotatably mounted in the chuck body and which has teeth thereon which cooperate with teeth on scroll plate 14 so that plate 14 may be rotated with respect to the other chuck parts, as is clearly shown in Fig. 1. Element 20 has an opening formed therein by which it may be engaged for turning.

The scroll plate 14 may also be rotated to move clamp members 15 outwardly and inwardly during the operation of the machine or when the machine is idle by manipulation of lever 5. Assuming the parts are in a position shown in Fig. 1, the right hand end of lever 5 may be moved upwardly, as viewed in Fig. 1, in order to move the tubular member 4 downwardly, as viewed in Fig. 1. This causes teeth 10 and 11 on rotatably mounted member 9 to respectively mesh with the helical teeth 12 and 13. Since helical teeth 12 and 13 are oppositely inclined with respect to each other this will cause the relative rotation of elements 9 and 16 to be added to the relative rotation of teeth 10 and 12 so as to rotate scroll plate 14 with respect to the other chuck parts and thereby cause the desired movement in clamp members 15.

It is thus evident that in the construction illustrated in Figs. 1-3 there are no intermeshing parts which are running idly with respect to each other when the clamp members 15 are held stationary and when the chuck operating mechanism is in the neutral position shown in Fig. 1. In this way undesired noise and wear is materially reduced. Also, it is evident that clamps 15 may be actuated by manipulation of lever 5 either during the operation of the machine or when the machine is idle in order to quickly and effectively move clamps 15 toward and away from each other.

In an economical construction of the apparatus disclosed in Fig. 1 where only a small opening of the clamping members 15 is desired, the teeth 13 may be replaced by straight key members or teeth which cooperate with teeth 11 so as to form suitable engagement with teeth 11. This construction will produce a lesser rotation of scroll plate 14 than is the case where helical teeth 13 are provided.

In the above described embodiment of my present invention the entire chuck construction, with the exception of support members 1 and 2 and actuating lever 5, rotates as a unit during the operation of the machine. In some special cases a construction in which parts of the chuck operating mechanism remain stationary during the operation of the machine may be desirable.

Such a construction is illustrated in Figs. 4 and 5 which show a stationary housing 32 for the chuck actuating parts, a ring member 31 supported by means of trunnions 33 in the housing 32 and an operating linkage, comprising handle member 34, which is pivotally connected to these trunnions 33 so as to move ring members 31 to the right and left in housing 32, as viewed in Fig. 4. Connected to ring member 31 is the annular gear member 30 having inner spaced sets of teeth corresponding to tooth members 10 and 11 in the embodiment shown in Fig. 1. Scroll plate member 37 is rotatably supported in the chuck body 36 and has outwardly projecting teeth formed thereon which correspond to helical teeth 12 in the above described embodiment. Fixedly mounted in the chuck body 36 is the annular member 35 having outer helical teeth spaced from the first mentioned set of teeth and corresponding to helical teeth 13 in the above described embodiment.

In the position of the parts as shown in Fig. 4 the chuck operating mechanism is in neutral position with the tooth members out of engagement with each other. Upon actuation of handle member 34, ring member 31 will be moved to the left, as viewed in Fig. 4, so that the tooth members on element 30 will engage with the above described helical teeth on elements 35 and 37, respectively, so as to rotate scroll plate 37 and thereby actuate the clamping members of the chuck.

It is evident that the construction disclosed in Figs. 4 and 5 is in part a reversal of the structure disclosed in Figs. 1-3 in that the helical teeth are externally arranged on their supporting members in the embodiment of Figs. 4 and 5, whereas they are internally arranged on their annular supporting members illustrated in Figs. 1-3. During the operation of the structure shown in Figs. 4 and 5 the elements 31, 30 and 35 remain stationary. Also, the construction shown in Figs. 4 and 5 may be operated either when the machine is idle or when the machine is running in order to actuate the clamping members of the chuck.

It will be understood that each of the elements described above, or two or more together, may also find find useful application in other types of chucks differing from the types described above.

While I have illustrated and described the invention as embodied in self centering chucks, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In a rotatable chuck for a lathe or the like, the combination of a chuck body having radially disposed guideways upon one side thereof; a rotatably adjustable scroll plate in the chuck body having a plurality of spiral grooves upon one side thereof; a plurality of radially movable jaws upon the chuck body slidably guided in the radial guideways thereon and having inward projections corresponding to and meshing with the spiral grooves in the scroll plate; an axially displaceable member having at least one portion thereof disposed in the chuck body; a collar fixed on the scroll plate with at least a first helicoidal member fixed upon the collar and inclined in one direction with respect to the central axis of the chuck; an annular member in the chuck body substantially aligned with the collar with at least one further helicoidal member fixed thereon and inclined in another direction with respect to said central axis of the chuck; means for axially shifting the axially displaceable member; and a further annular member carried on the latter displaceable member having integral means projecting thereon for simultaneously engaging with the first and further helicoidal members in axial direction of movement of said displaceable member to rotatably adjust said scroll plate and thereby correspondingly move said jaws in said radial guideways.

2. In a rotatable chuck for a lathe or the like, the combination of a chuck body having radially disposed guideways upon one side thereof; a rotatably adjustable scroll plate in the chuck body having a plurality of spiral grooves upon one side thereof; a plurality of radially movable jaws upon the chuck body slidably guided in the radial guideways thereon and having inward projections corresponding to and meshing with the spiral grooves in the scroll plate; an axially displaceable member having at least one portion thereof disposed in the chuck body; a collar fixed on the side of the scroll plate opposite to that carrying the spiral grooves; first helicoidal teeth fixed within the collar and inclined in one direction with respect to the central axis of the chuck; an annulus secured in the chuck body in substantial alignment with the collar; further helicoidal teeth fixed in the annulus and inclined in another direction with respect to central axis of said chuck; means for axially shifting the axially displaceable member; an annular member rotatably mounted upon the latter displaceable member and positively axially displaceable therewith; and peripheral teeth fixed on said annular member for simultaneously engaging with the first and further helicoidal teeth in axial direction of movement of said displaceable member to rotatably adjust said scroll plate and thereby correspondingly move said jaws in said radial guideways.

TULLIO EVANGELISTA.

REFERENCES CITED

The following references are of record in the file of this patent:

UNITED STATES PATENTS

| Number | Name | Date |
| --- | --- | --- |
| 1,608,464 | Cutler | Nov. 23, 1926 |
| 1,713,796 | Whiton | May 21, 1929 |
| 2,358,049 | Bogart | Sept. 12, 1944 |